July 7, 1931. H. E. McCANDLESS 1,812,971
INFANT'S COMBINATION BATHTUB AND DRESSING TABLE
Filed Dec. 24, 1927 7 Sheets-Sheet 1

INVENTOR
Harry E. McCandless
BY Harold E. Stonebraker
his ATTORNEY

July 7, 1931. H. E. McCANDLESS 1,812,971
INFANT'S COMBINATION BATHTUB AND DRESSING TABLE
Filed Dec. 24, 1927 7 Sheets-Sheet 3

INVENTOR
Harry E. McCandless
BY Harold R. Stonebraker
his ATTORNEY

July 7, 1931.   H. E. McCANDLESS   1,812,971
INFANT'S COMBINATION BATHTUB AND DRESSING TABLE
Filed Dec. 24, 1927    7 Sheets-Sheet 4
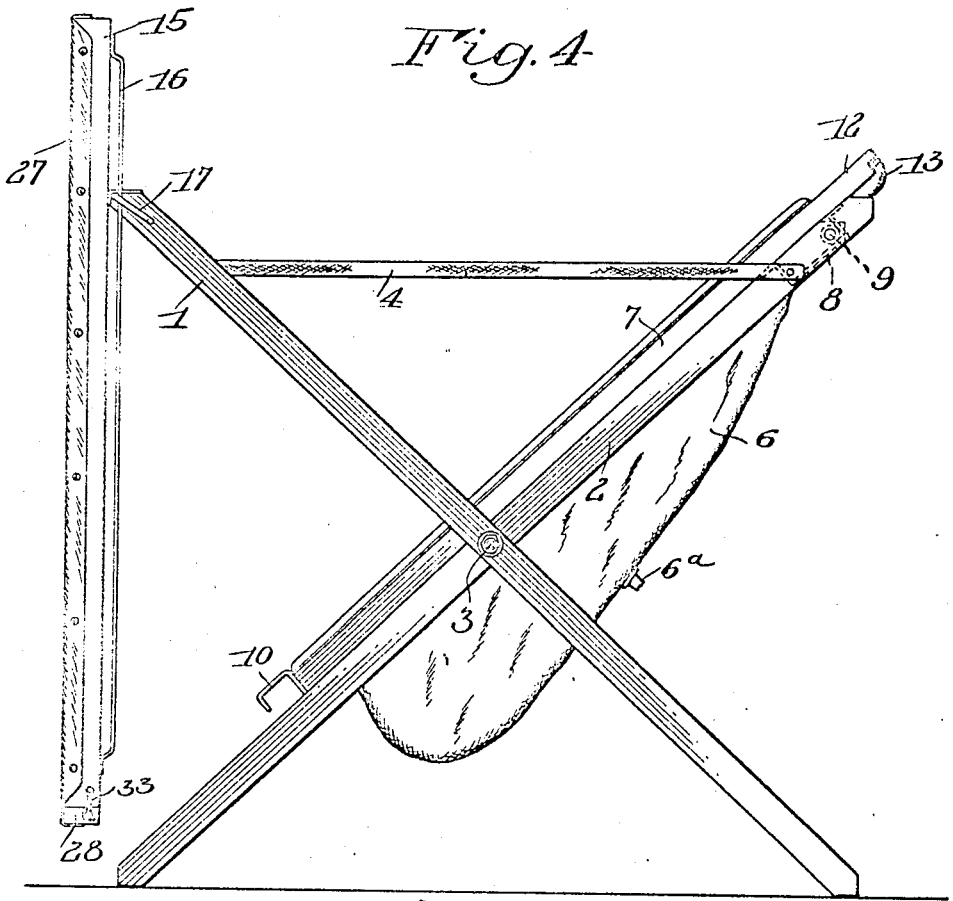
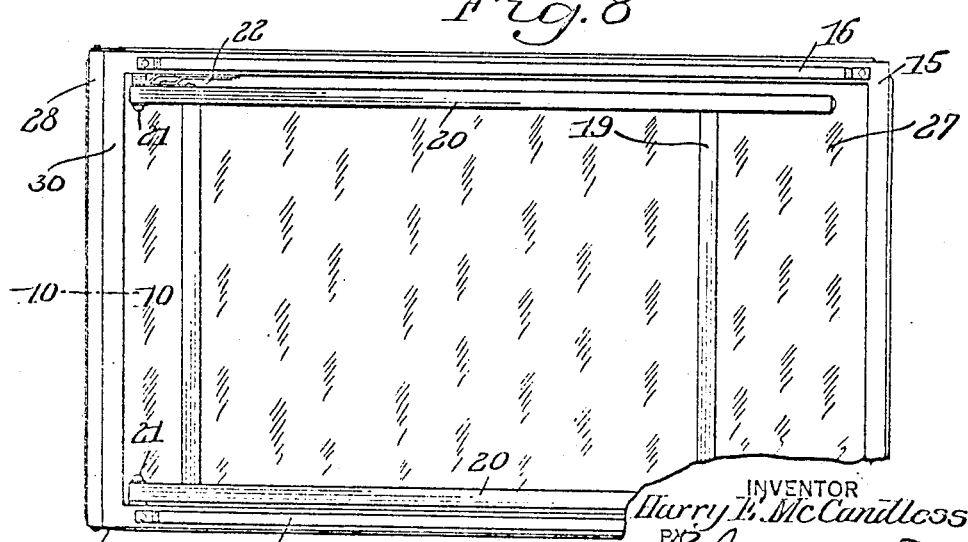

July 7, 1931.  H. E. McCANDLESS  1,812,971
INFANT'S COMBINATION BATHTUB AND DRESSING TABLE
Filed Dec. 24, 1927  7 Sheets-Sheet 5

INVENTOR
Harry E. McCandless
BY
Harold E. Stonebraker,
his ATTORNEY

July 7, 1931. H. E. McCANDLESS 1,812,971
INFANT'S COMBINATION BATHTUB AND DRESSING TABLE
Filed Dec. 24, 1927 7 Sheets-Sheet 6
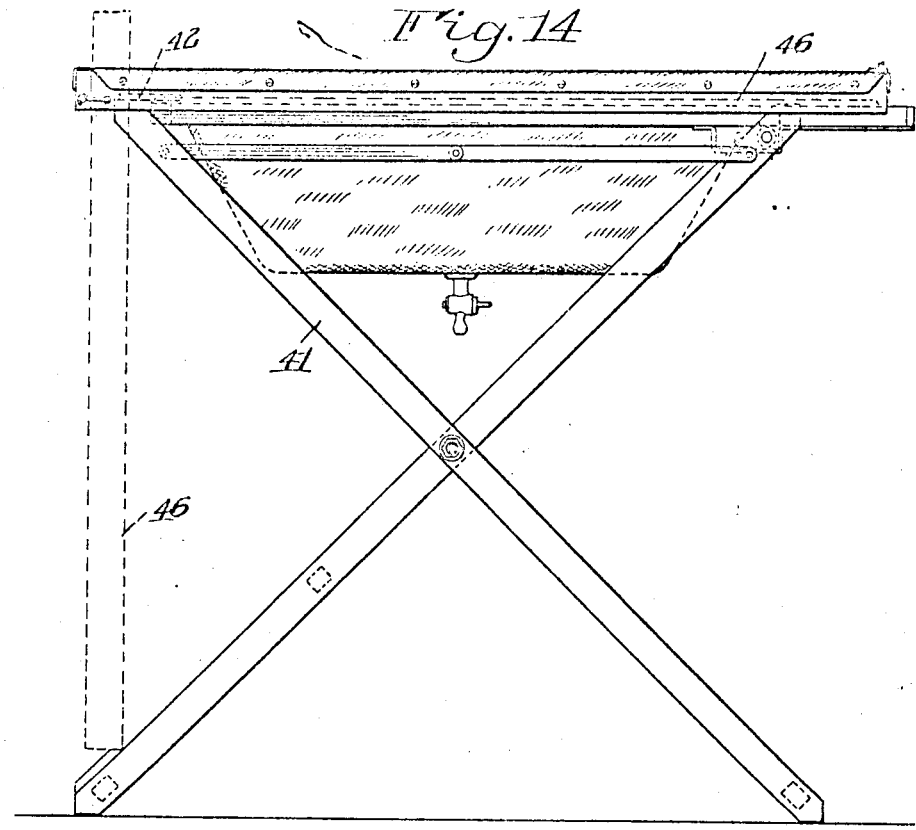
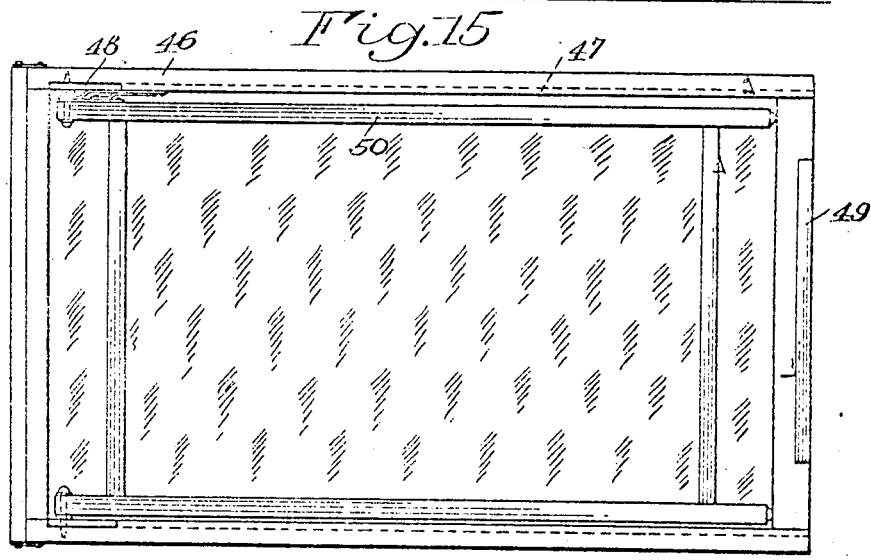
INVENTOR
Harry E. McCandless
BY Harold E. Stonebraker
his ATTORNEY July 7, 1931. H. E. McCANDLESS 1,812,971
INFANT'S COMBINATION BATHTUB AND DRESSING TABLE
Filed Dec. 24, 1927    7 Sheets-Sheet 7
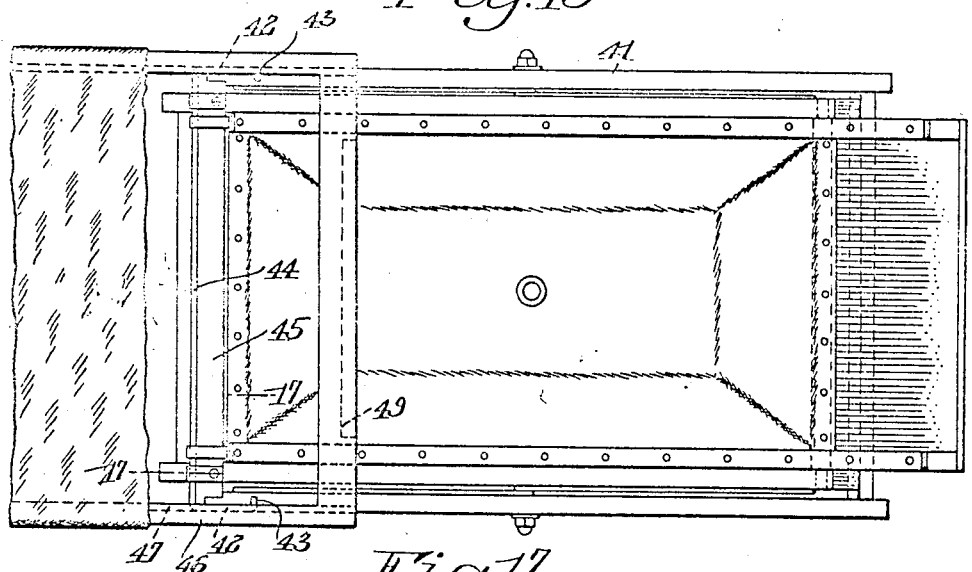
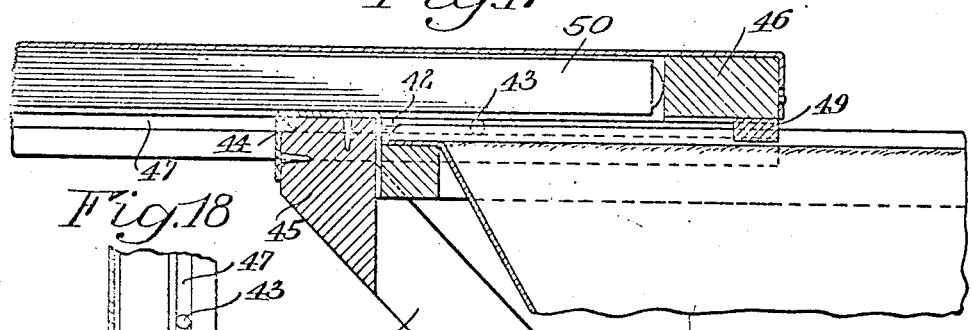
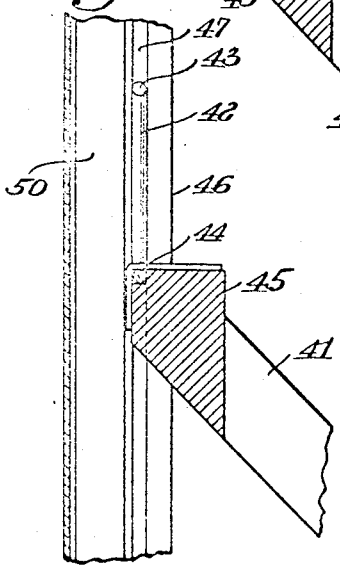
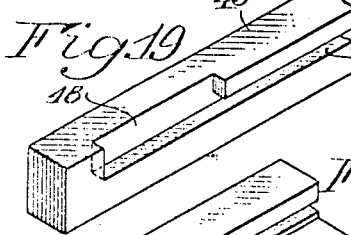
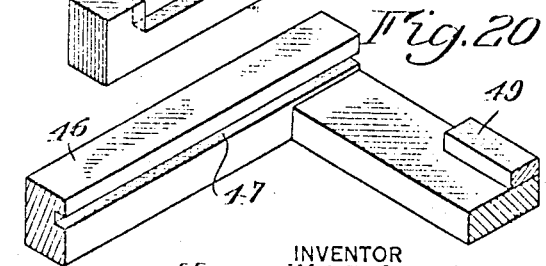
INVENTOR
Harry E. McCandless
BY Harold E. Stonebraker,
his ATTORNEY Patented July 7, 1931

1,812,971

UNITED STATES PATENT OFFICE

HARRY E. McCANDLESS, OF ROCHESTER, NEW YORK

INFANT'S COMBINATION BATHTUB AND DRESSING TABLE

Application filed December 24, 1927. Serial No. 242,304.

This invention relates to an infant's combination bath tub and dressing table, and has for its principal object to provide a foldable structure for the purpose mentioned which shall be rigid, practicable and durable, and can be manufactured at a reasonable cost.

A more particular object of the invention is to afford a foldable combination tub and dressing table in which the table member can be arranged in one of three different positions, namely, either immediately over the tub in horizontal position, or extending horizontally from one end of the tub or stand so as to afford a table adjacent to the tub, or in vertical position at one edge of the tub or stand, with provision for supporting the free end of the table when disposed horizontally adjacent to the tub.

Another purpose of the invention is to afford a novel structure for folding in which the tub is mounted in a frame that can be positioned horizontally between the supports of a folding stand or disposed parallel to one of the supports when it is desired to collapse the stand.

A further purpose of the invention is to afford a combination structure of the character mentioned in which the supporting stand is foldable endwise and the table member is slidable endwise of the stand and positionable vertically at one end, thus affording a stable structure and one which can be readily controlled and manipulated.

An additional object of the improvement is to afford a simplified and practical arrangement which permits of folding the parts readily into a compact relationship, permitting of the device being easily carried when folded and readily adjusted into normal operating relationship.

The invention also contemplates the provision of novel and improved means for tightly fastening and retaining a canvas or other flexible cover on the table member and for detachably mounting a table member on the stand so that it can be slidably moved to any one of the three alternative positions made possible with this structure or entirely removed from the stand if desired.

To these and other ends, the invention consists in certain improvements and combinations of parts, all of which will be more fully described hereinafter, the novel features being pointed out in the claims at the end of the specification.

In the drawings:

Figure 4 is a view similar to Figure 3 but with the tub frame positioned parallel to the support on which it is mounted, preparatory to folding the stand;

Figure 6 is a plan view of the parts illustrated in Figure 3, showing the table member in horizontal section;

Figure 8 is a bottom plan view with parts broken away of the table member showing its supporting legs in folded position;

Figure 12 is an enlarged detail sectional view on line 12—12 of Figure 6;

Figure 13 is an enlarged detail sectional view on line 13—13 of Figure 6;

Figure 14 is a side elevation of a modified form of the invention and illustrating in dotted line position the table member positioned vertically at one end of the stand;

Figure 15 is a bottom plan view of the table member made in accord with the structure of Figure 14;

Figure 16 is a plan view of the structure illustrated in Figures 14 and 15 and showing the table member adjusted to such position on the stand as to permit entirely removing the table member therefrom, a portion of the cover for the latter being broken away to show clearly the parts thereunder;

Figure 17 is a sectional view on line 17—17 of Figure 16;

Figure 18 is a detail sectional view of the same parts when the table member is shifted to vertical position at the end of the stand;

Figure 19 is a detail perspective view, partially broken away, of one of the sides of the table member, and Figure 20 is a detail perspective view, partially broken away, of the opposite end portion of the same side of the table member and the end adjacent thereto.

Figure 1:
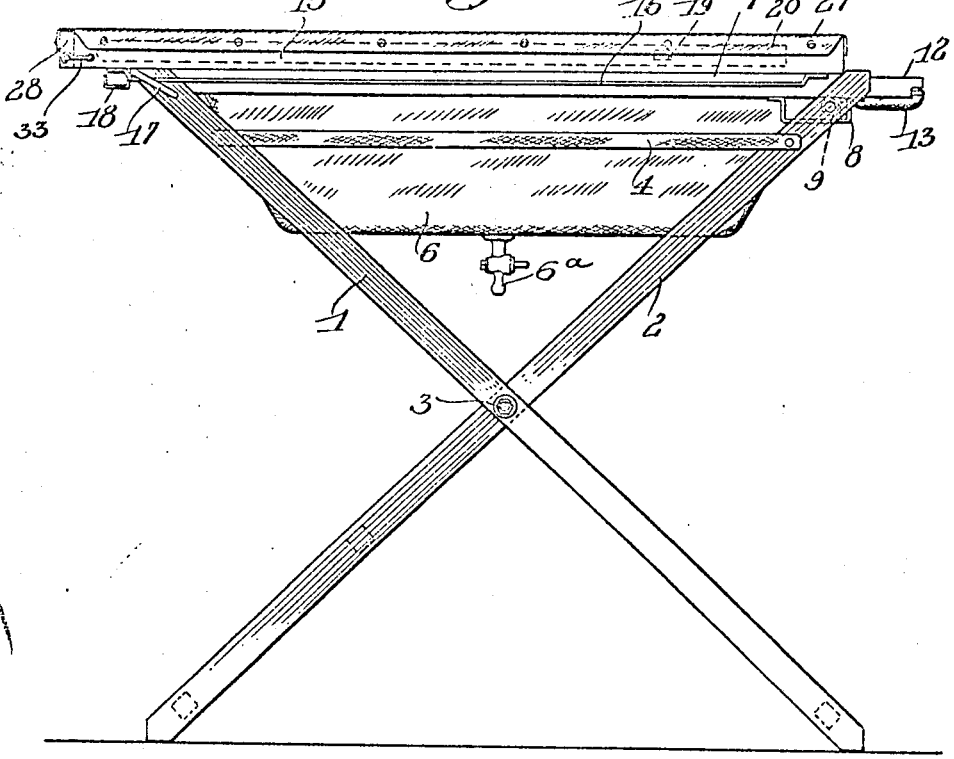
Figure 1 is a side elevation of a preferred embodiment of the invention showing the tub in operating position with the table member positioned for use horizontally above the tub.

Referring in detail to the drawings, in which similar reference characters throughout the several views indicate the same parts, the construction illustrated in Figures 1 to 13 inclusive will first be described, and thereafter the modified arrangement disclosed in Figures 14 to 20 inclusive, it being understood that these forms of the invention are merely illustrative of various practical adaptations of the improvements.

In the arrangement referred to first, the structure includes a foldable stand consisting of supports 1 and 2 pivotally connected together at 3 and adapted to be folded, or to be held in operating position by the flexible straps 4. Supported by the stand just described is a tub 6 having a suitable valve connection 6ª at the bottom whereby it may be filled with water from a suitable hose or drained when desired.

Figure 7:
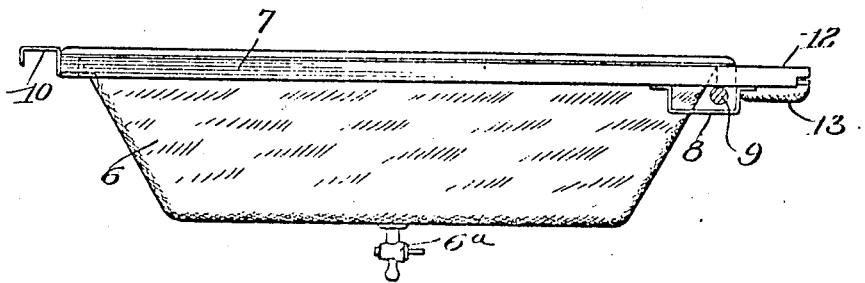
Figure 7 is a side view of the tub and tub frame.
Figure 9:
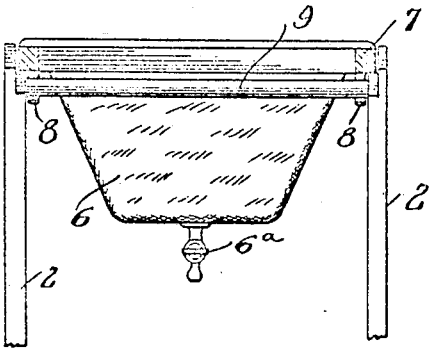
Figure 9 is a transverse vertical sectional view on line 9—9 of Figure 3.
Figure 5:
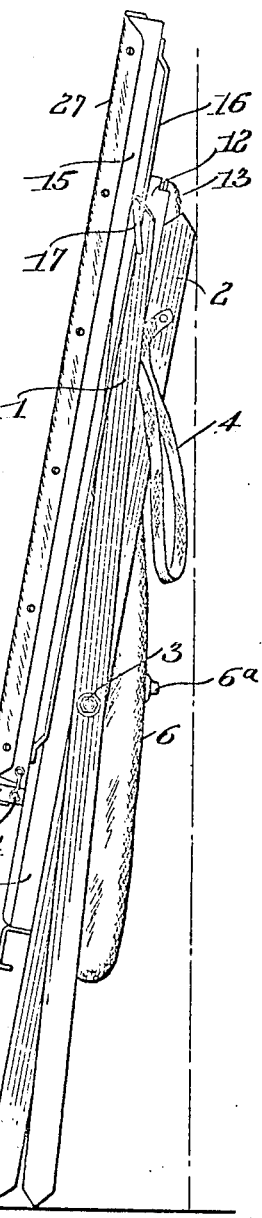
Figure 5 is a side elevation showing the parts in folded relationship.

The tub 6 is mounted in a tub frame 7, see Figure 7, provided with loop portions 8 engaging the cross rod 9 on the support 2, and thereby providing a permanent pivotal and sliding connection between the support 2 and the tub frame 7, while 10 designates hooks or brackets on the tub frame adapted to engage the cross bar 11 of the support 1 to hold the tub frame in horizontal position on the stand, as shown in Figures 1, 6 and 13. Assuming the parts in the position shown in Figure 3, when the device is to be folded, the left hand end of the tub frame is lifted slightly to disengage the hooks 10 from the cross bar 11 and the tub frame is then moved to the right far enough to permit it to clear the cross bar 11 and to be dropped down to the position shown in Figure 4 where it is parallel with the support 2, so that the structure can be folded into the arrangement shown in Figure 5 to permit it being carried easily from place to place. The tub frame is provided with an extension 12 at one end having a flexible tray 13 for soap and other toilet articles.

Figure 3:
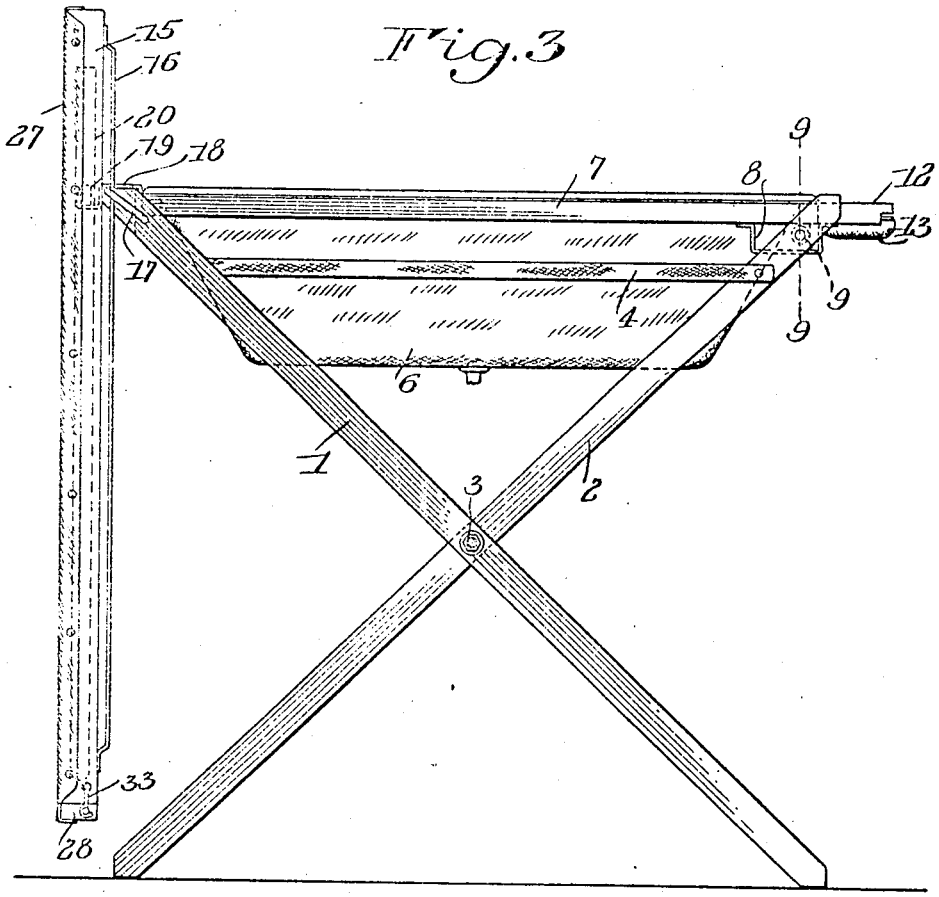
Figure 3 is a similar view of the table member adjusted to vertical position at one end of the stand and tub.

The structure thus far described has to do with the stand and the means for mounting the tub frame thereon and holding it either in horizontal or operating position, or swinging it down into position to permit collapsing of the stand, and the structure now to be described has to do with the dressing table part of the combination and the means whereby the dressing table may be located horizontally either above the tub, or to one side of the tub, or in vertical position at one end when the tub is in use without the table member, as in Figure 3.

To accomplish this, as disclosed in Figures 1 to 13 inclusive, a table member is employed designated generally at 15 having metal straps 18 attached to the undersurfaces of the sides of the table member and engaging metal loops 17 secured to the support 1, see Figures 1 and 6, the table member being thereby movable endwise between the limits of the straps 16. In this manner, the table member is permanently attached to the support 1 and movable with relation thereto into either of the several positions now to be described.

In the normal operating position with the dressing table in use and the tub not in use, the table is adjusted over the tub to the position shown in Figure 1. When desired to use the tub without the table member, the latter is moved along to the left of Figure 1 for a distance and then swung to a vertical position, as shown in Figure 3, it being supported in this position by brackets or hooks 18 that receive the cross rod 19 carried by the table member, see Figure 6. When it is desired to use both the tub and table at the same time, the table member can be positioned horizontally adjacent to or extending from one end of the tub and stand, as shown in Figure 2.

Figure 2:
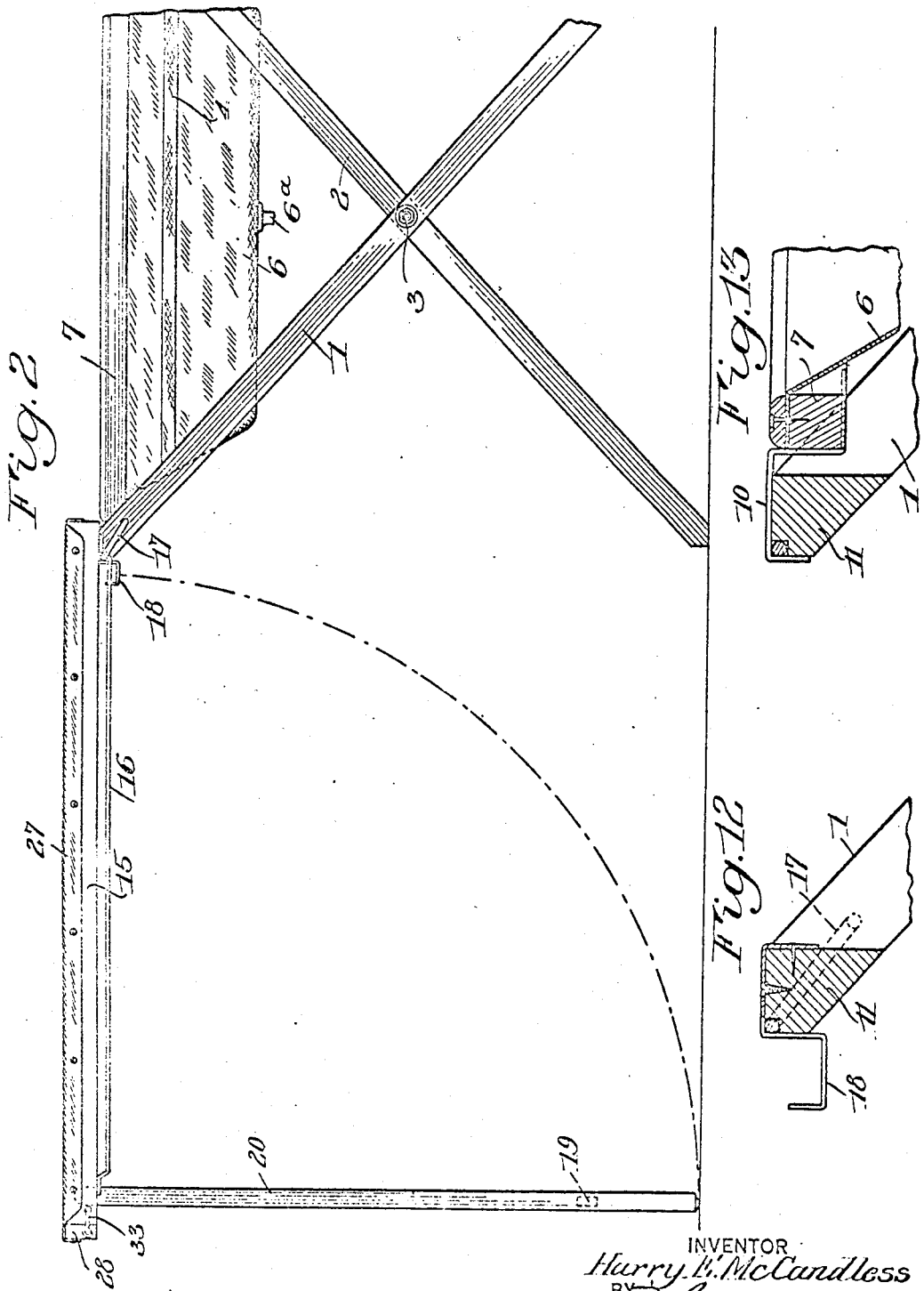
Figure 2 is a similar view with parts broken away and showing the table member extending horizontally away from one end of the tub or stand for use adjacent to and simultaneously with the tub.

For this purpose, the table member is moved laterally to the limit of its movement, or until the loops 17 engage the right hand ends of the straps 16, as shown in Figure 2, the table member being held in such position by legs 20 supporting the free end of the table member. The legs 20 preferably come into operation automatically as the table member reaches the end of its movement, and to accomplish this, the legs 20 are pivoted to the underside of the table member at 21, as shown in Figure 8, and are normally folded up under the table member as shown in Figure 8. The legs are held in this position by engagement with the top of the tub frame and support 1, and as soon as the legs 20 are in position to clear the support 1, as in Figure 2, they fall by gravity to the position there shown and are held locked in such position by the structure shown in Figure 10.

The legs 20 have connected thereto links 22 which are pivoted at 23 and slotted at 24 for engagement with pins 25 extending from the plates 26 attached to the sides of the table member. Thus when the legs 20 drop to the position shown in Figure 2, suitable recessed portions in the slots 24 engage the pins 25 and prevent accidental collapsing of the legs 20. When the table member is no longer to be used in this position, the legs 20 are released, by pressing upwardly on the links 22, freeing them from the pins 25, and the legs 20 are then swung to their upward position against the table member. When the legs are thus pushed upwardly, the table member can be again positioned by a sliding movement either over the tub or to its vertical position as in Figure 3 and already described.

Figure 10:
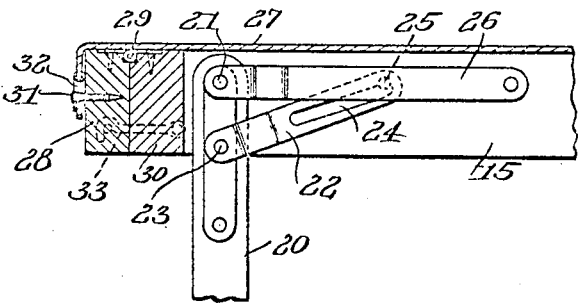
Figure 10 is an enlarged detail sectional view on line 10—10 of Figure 8.
Figure 11:
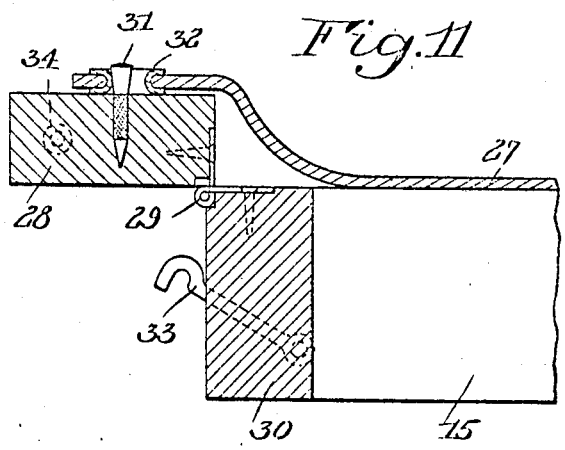
Figure 11 is a similar view showing the holder for the flexible top positioned to release the latter.

The table member is provided with a flexible top preferably of canvas or like material, as designated at 27, see Figures 10 and 11, and one of the difficulties in connection with a structure of this character has been to maintain the top sufficiently tight to support an infant thereon and prevent undue sagging. To accomplish this in a practical and efficient way, the following structure has been provided. The flexible top or cover 27 is fixedly attached to one end of the frame of the table member by suitable eyelets engaging pins, and at the opposite end the flexible top is attached to a movable holder which serves to stretch and draw the top tightly as it is moved into operative position.

Referring to Figures 10 and 11, 28 designates the movable holder preferably in the form of a cross bar pivotally attached at 29 to the end piece 30 of the frame of the table member. 31 designates pins carried by the movable holder 28 for engagement with eyelets 32 in the flexible top. The free end of the latter is attached initially, as shown in Figure 11, and the movable holder is then swung downwardly to the position shown in Figure 10, stretching the flexible top 27 and holding it drawn tightly in proper position. The movable holder is held in such operative position by suitable locking means which may consist of hooks 33 pivoted on the frame of the table member and engaging pins 34 on the movable holder 28, as shown in Figure 10. To remove the flexible top 27, the hooks 33 are lifted to the position shown in Figure 11, releasing the movable holder 28 and permitting the flexible cover to be taken off without difficulty, when necessary for cleaning or otherwise.

The structure thus far described relates more particularly to the form of the invention in which the table member is permanently associated with the foldable stand, and the structure in Figures 14 to 20 will now be described, the same having to do with the modified arrangement in which the table member can be adjusted to any one of the three positions already described, or entirely removed from the collapsible stand if desirable.

Referring to Figures 14 to 20, the support 41 is provided with pivotally mounted guide members 42 having inturned ends 43 and forming part of a cross rod 44 attached to the cross piece 45, as shown in Figure 16. The guide members 42 can thus be swung either to the horizontal position shown in Figures 14 and 16, or to the vertical position shown in Figure 18. These guide members serve to retain and control the sliding movement of the table member which includes sides 46 provided with grooves or slots 47, as shown in Figures 19 and 20.

At one end of each of the sides 46 they are recessed or cut away as at 48, and the table member can be removed by sliding it longitudinally, as shown in Figure 16, until the cut away portions 48 register with the guide members 42. In this position, the table member can be lifted off. Once the table member is moved slidably along the stand until the guide members 46 are out of register with the recesses 48, the guide members 42 engage the guideways or slots 47 and permit the required sliding movement of the table member, such movement in the opposite direction being limited by the stop 49 engaging the cross piece 45 of the stand. When in this position, the table member can be tilted to the vertical position shown in Figure 14, and when in its extreme horizontal position, it can be supported adjacent to the stand and tub by the legs 50 in the same manner as that already described with reference to the structure in Figures 1 to 13 inclusive.

While the invention has been described with reference to certain particular structural embodiments, it is not confined to the detailed arrangements shown and described, and this application is intended to cover any other departures or modified arrangements coming within the intent of the improvements or the scope of the following claims.

I claim:

1. The combination with a foldable stand of the cross-leg type comprising two supports pivotally connected together at their center portions, of a tub frame pivotally mounted at the upper edge of one of the supports, said tub frame being positionable either horizontally between the tops of the supports or parallel to one of the supports to permit folding the stand, and a tub carried in said frame.

2. The combination with a foldable stand of the cross-leg type comprising two supports pivotally connected together at their center portions, of a tub frame pivotally mounted at the upper edge of one of the supports and positionable either horizontally between the upper edges of the supports or collapsible to a position parallel to the support on which it is mounted to permit folding the stand, and a table member slidably mounted on the stand and positionable either horizontally above the stand or vertically beside the stand.

3. The combination with a foldable stand of the cross-leg type comprising two supports pivotally connected together at their center portions, of a tub frame pivotally mounted at the upper edge of one of the supports and positionable either horizontally between the upper edges of the supports or parallel to the support on which it is mounted to permit folding, and a table member pivotally connected to the stand and freely slidable endwise thereon to occupy a position vertically at one end of the stand or to horizontal positions either above the stand or extending away from the stand at one end thereof, and means for supporting the free end of the table member when in its last mentioned position.

4. The combination with a foldable stand including pivotally connected supports, of a tub frame connected with the stand and positionable either horizontally thereon or parallel to one of the supports to permit folding the stand, guide members pivotally mounted on one of the supports, and a table member having sides with guide slots engaging said guide members, said sides being cut away adjacent one end of each of the slots to permit engagement or disengagement of the table member with the guide members.

5. The combination with a foldable stand and tub thereon, of a table member positionable horizontally over the tub, said table member comprising a frame and a flexible top secured thereon, means for securing one end of the flexible top including a holder pivotally attached to the upper edge of one end of the frame to permit stretching the flexible top after it is attached, said holder occupying a position abutting said end of the frame and the top surface of the holder forming a continuation of the top surface of the frame when the flexible top is stretched, and devices for locking the holder in position when the flexible top is drawn tight.

6. The combination with a foldable stand and tub thereon, of a table member positionable horizontally over the tub, said table member comprising a frame and a flexible top secured thereon, a bar transversely pivoted at the upper edge of one end of the frame and adapted to receive one end of the flexible top said bar abutting said end of the frame and having its top surface parallel to the top surface of the frame when the flexible top is stretched, and means for locking the bar in position when the flexible top is drawn tight.

7. The combination with a foldable stand comprising supports pivotally connected at their middle portions, of a tub frame pivoted at one end to the upper edge of one of said supports and detachably connected with the upper edge of the other support, and a table member pivotally and slidably mounted on the latter support and adapted to engage the first mentioned support to occupy a horizontal position on the supports.

8. The combination with a foldable stand comprising supports pivotally connected at their middle portions, of a tub frame pivoted at one end to the upper edge of one of said supports and detachably supported on the upper edge of the other support and movable independently thereof to a position parallel with the first mentioned support, and a table member pivotally and slidably mounted on the second mentioned support and supported in a horizontal position on top of the other support and movable horizontally to occupy a position to one side of the stand or collapsible to a vertical position on its support.

In witness whereof, I have hereunto signed my name.

HARRY E. McCANDLESS.